United States Patent [19]

Leung

[11] Patent Number: 5,587,345
[45] Date of Patent: *Dec. 24, 1996

[54] HIGH FLEXURAL STRENGTH CARBON FIBER REINFORCED SILICON CARBOXIDE COMPOSITE

[75] Inventor: Roger Y. Leung, Schaumburg, Ill.

[73] Assignee: AlliedSignal Inc., Morris Township, Morris County, N.J.

[ * ] Notice: The term of this patent shall not extend beyond the expiration date of Pat. No. 5,318,930.

[21] Appl. No.: 462,374

[22] Filed: Jun. 5, 1995

Related U.S. Application Data

[60] Division of Ser. No. 629,923, Dec. 19, 1990, Pat. No. 5,486,251, which is a continuation-in-part of Ser. No. 464,470, Jan. 12, 1990, Pat. No. 5,512,359, and a continuation-in-part of Ser. No. 523,620, May 15, 1990, Pat. No. 5,468,318.

[51] Int. Cl.⁶ .................................................. C03C 14/00
[52] U.S. Cl. ............................. 501/32; 501/87; 501/95
[58] Field of Search ............................ 501/32, 87, 99, 501/95

[56] References Cited

U.S. PATENT DOCUMENTS

| | | | |
|---|---|---|---|
| 3,944,519 | 3/1976 | Mink et al. | 260/46.5 UA |
| 4,460,638 | 7/1984 | Haluska | 428/224 |
| 4,460,639 | 7/1984 | Chi et al. | 448/224 |
| 4,460,640 | 7/1984 | Chi et al. | 428/224 |
| 4,981,820 | 1/1991 | Renlund | 501/39 |
| 5,039,635 | 8/1991 | Stempin et al. | 501/32 X |
| 5,132,254 | 7/1992 | Stempin et al. | 501/32 |
| 5,192,475 | 3/1993 | Tredway | 501/32 X |
| 5,225,283 | 7/1993 | Leung et al. | 501/32 X |
| 5,242,866 | 9/1993 | Leung et al. | 501/32 X |
| 5,318,930 | 6/1994 | Leung et al. | 501/32 |
| 5,340,777 | 8/1994 | Leung et al. | 501/12 |
| 5,354,602 | 10/1994 | Stranford et al. | 501/95 X |
| 5,376,595 | 12/1994 | Zupancic et al. | 501/12 |
| 5,438,025 | 8/1995 | Leung et al. | 501/95 X |

FOREIGN PATENT DOCUMENTS

| | | |
|---|---|---|
| 4033493 | 5/1991 | Germany. |
| 9314040 | 7/1993 | WIPO. |

OTHER PUBLICATIONS

F. I. Hurwitz, "Polymeric Routes to Silicon Carbide and Silicon Oxycarbide CMC", vol. 12, No. 7–8, Ceramic Engineering and Sci. Proceedings, pp. 1292–1308 (1991). No Month.

Prewo et al. Fiber Reinforced Glasses and Glass Ceramics for High Performance Applications, Ceramic Bulletin, vol. 65, No. 2 (1986) pp. 305–313. No Month.

Primary Examiner—Karl Group
Attorney, Agent, or Firm—Harold N. Wells; Roger H. Criss

[57] ABSTRACT

An improved fiber reinforced glass composite includes a carbon fiber in a matrix of a black glass ceramic having the empirical formula $SiC_xO_y$ where x ranges from about 0.5 to about 2.0, preferably 0.9 to 1.6 and y ranges from about 0.5 to 3.0, preferably 0.7 to 1.8. Preferably the black glass ceramic is derived from cyclosiloxane monomers containing a vinyl group attached to silicon and/or a hydride-silicon group. Graceful failure can be obtained when the carbon fibers are highly graphitized.

10 Claims, No Drawings

HIGH FLEXURAL STRENGTH CARBON FIBER REINFORCED SILICON CARBOXIDE COMPOSITE

This application is a divisional of application Ser. No. 07/629,923, filed Dec. 19, 1990, now U.S. Pat. No 5,486, 251, which is a continuation-in-part of application Ser. No. 07/464,470, filed Jan. 12, 1990, now U.S. Pat. No. 5,512, 359, and a continuation-in-part of application Ser. No. 07/523,620, filed May 15, 1990, now U.S. Pat. No. 5,468, 318.

PRIOR ART

The invention relates generally to composite laminates in which a matrix material is reinforced with fibers. Laminates with a polymer matrix are widely used for various purposes, but they are not generally applicable in situations where temperatures are expected to be above about 300° C. The present invention relates to carbon fiber reinforced-glass matrix composites having application at temperatures which would destroy conventional polymeric materials.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 002,049 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7 to 1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of black glass precursors to reinforcing fibers to form laminates very useful in high temperature applications.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed, and since they release alcohols and contain excess water, they must be carefully dried to avoid fissures in the curing process.

Another U.S. Pat. No. 4,460,640, disclosed related fiber reinforced glass composites using organopolysiloxane resins of U.S. Pat. No. 3,944,519 and U.S. Pat. No. 4,234,713 which employ crosslinking by the reaction of SiH groups to $CH_2=CHSi$ groups. These later two patents have in common the use of organosilsesquioxanes having $C_6H_5SiO_{3/2}$ units, which have been considered necessary by the patentees to achieve a flowable resin capable of forming a laminate. A disadvantage of such $C_6H_5SiO_{3/2}$ units is their tendency to produce free carbon when pyrolyzed. The present invention requires no such $C_6H_5SiO_{3/2}$ units and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. The present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over-cured. The present invention can be carried out after coating the fibers and requires no pre-curing step.

In co-pending U.S. patent application Ser. No. 07/426,820 composites of refractory fibers with a black glass matrix were disclosed. Such composites have good physical properties but tend to exhibit brittle fracture with little evidence of fiber pullout. The composites reported in U.S. Pat Nos. 4,460,639 and 4,460,640 also exhibit brittle fracture with a flexural strength of less than 308 MPa.

Ceramic matrix composites which combine whiskers, particulates, staples, or continuous fibers with ceramic matrix offer a potential to overcome the catastrophic brittle failure inherent to monolithic ceramics. Among these reinforcement types, continuous fiber is the most effective means known for toughening ceramics. If brittle fracture is replaced by the graceful fibrous fracture, ceramic composites may be used reliably as an engineering material for structural and other high performance applications.

The type of failure is to large extent determined by the nature of the interface between the reinforcement fiber and the surrounding matrix. In ceramic composites, high toughness results when energy is absorbed as fibers pull out from the matrix as the composite cracks. Thus, a low interfacial stress or friction is needed to ensure fibrous fracture. If a strong interfacial bond exists, the crack will cut through the fiber without pulling out the fiber, resulting in a fracture behavior not much different from unreinforced monolithic ceramics.

In co-pending U.S. patent application Ser. Nos. 07/464, 470 and 07/523,620 composites of refractory fibers with a black glass matrix were disclosed which exhibited a fibrous fracture. These composites have a high yield strength resulting from the deposition of carbon on the surface of the fibers which reduces the interfacial bonding to the black glass matrix.

The present invention relates to the use of certain carbon fibers in a silicon carboxide 'black' glass matrix, also producing a composite having a high strain-to-failure and exhibiting fibrous fracture.

SUMMARY OF THE INVENTION

An improved fiber reinforced glass composite of the invention comprises (a) carbon reinforcing fibers having a high degree of graphitization and, (b) a black glass ceramic matrix having the empirical formula $SiC_xO_y$ where x ranges from about 0.5 to about 2.0, preferably from 0.9 to 1.6, and y ranges from about 0.5 to about 3.0, preferably from 0.7 to 1.8.

In a preferred embodiment, the black glass ceramic composition (b) of the invention is the pyrolyzed reaction product of a polymer prepared from (1) a cyclosiloxane monomer having the formula

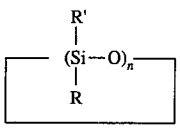

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, said polymerization reaction taking place in the presence of an effective amount of hydrosilylation catalyst. The polymer product is pyrolyzed in a non-oxidizing atmosphere to a temperature in the range of about 800° C. to about 1400° C. to produce the black glass ceramic.

The carbon fibers should be highly graphitized. The carbon assay of the fiber will be greater than 97%, preferably 99% or more and will have an electrical resistance less than about $1.2 \times 10^{-3}$ ohm-cm. Fibers derived from pitch are preferred. Other fibers which may be used include surface-graphitized carbon fibers and carbon fibers with vapor phase deposited graphite.

These carbon fiber reinforced black glass composites show flexural strength greater than about 300 MPa at room temperature and fibrous, graceful fracture at temperatures up to about 700° C. A two- to four-fold increase in flexural strength and a two- to four-fold increase in strain at maximum stress has been obtained as compared with black glass composites made with polyacrylonitrile (PAN) derived carbon fibers which fail in a brittle manner and have relatively low graphite content.

In another embodiment the invention comprises a method of preparing a fiber reinforced glass composite wherein the cyclosiloxane reaction product described above is combined with carbon fibers which may be in the form of woven fabric or unidirectionally aligned fibers. Plies of the fibers may be laid-up to form a green laminate and thereafter pyrolyzed in a non-oxidizing atmosphere at a temperature between about 800° C. and about 1400° C., preferably about 850° C., to form the black glass composite. The laminate may be reimpregnated with polymer solution and repyrolyzed in order to increase density. Alternatively, a resin transfer technique may be used in which fibers, optionally having a carbon coating, are placed in a mold and the black glass matrix precursor is added to fill the mold before curing to form a green molded product. In some embodiments the composite may be heated in air at a temperature up to about 350° C. for a time sufficient to oxidize the surface of the carbon fibers.

DESCRIPTION OF THE PREFERRED EMBODIMENTS

Black Glass Ceramic

The black glass ceramic used as the matrix has an empirical formula $SiC_xO_y$ wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis in a non-oxidizing atmosphere at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. When the polymer is placed in a non-oxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

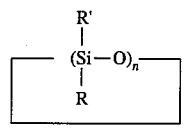

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydro-cyclotetrasiloxane. Alternatively, two or more cyclosiloxane monomers may be polymerized. Such monomers would contain either a silicon hydride bond or a silicon-vinyl bond and the ratio of the two types of bonds should be about 1:1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane, 1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent. Resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

The manufacturing processes for making carbon fibers of the invention include carbonization and graphitization of carbon fiber precursors. In carbonization, the precursor fiber is thermally pyrolyzed in an inert atmosphere to remove most of its noncarbon elements, resulting in a carbon fiber with 92–98% carbon assay and with low order of graphite structure. Carbonization temperature ranges from 1000° C. to 1700° C., usually between 1100°–1300° C. a second heat treatment called graphitization is used to increase the orientation of the graphitic hexagonal plane in the direction of the fiber axis. Graphitization temperature ranges from 1500° C. to 3000° C., usually between 2000° C. and 2800° C. Graphitization step improves the carbon assay of the fiber to above 97%, in most cases to 99+% carbon. The higher the graphitization temperature, the higher the fiber modulus and its electrical conductivity. This is the result of the increased alignments of the graphite crystallites along the fiber axis. Therefore, fiber electrical conductivity may be indicative of the degree of graphitization of the fiber.

Reinforcing fibers useful in the composites of the invention are carbon fibers which exhibit a high degree of graphitization. By this is meant that the carbon fiber has been heat treated in an inert atmosphere above 1700° C., usually between 2000° C. and 3000° C. Such fibers are nearly pure carbon, typically being 97% to 99% carbon or more and have a specific resistance less than about $1.2 \times 10^{-3}$ ohm-cm. The preferred fibers are derived from pitch, which is highly graphitized. By contrast, polyacrylonitrile (PAN) derived fibers have been found to be unsatisfactory, as will be seen in the examples. Such fibers have a lower degree of graphitization and are only 92–95% carbon in commercially available fibers.

The fibers may have various sizes and forms. They may be monofilaments from 1 μm to 200 μm diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. The improved strength and toughness of pitch-derived carbon fibers is believed to result from a weak interface between the fibers and the black glass matrix. PAN-derived carbon fibers have been found to exhibit brittle fracture which is believed to result from strong bonding between the fibers and the black glass matrix.

Carbon fiber reinforced black glass matrix composites with a highly graphitized carbon interface would provide the same toughening effect as the pitch-based graphite fiber. There are three classes of carbon fibers that are useful in the composites of the invention. The first class is pitch-based fibers. The second class is PAN, rayon, and pitch fibers that are surface graphitized. The surface graphitization is achieved by heating the fiber in an inert atmosphere to temperatures higher than about 2000° C., resulting in improved graphitic ordering on the fiber surface. The third class is deposition of ordered graphitic structure by chemical vapor deposition (CVD). The CVD process produces an almost perfect graphite structure when heat-treated at 3000° C. An interface of high degree of graphitization is needed in order to provide the appropriate interface for graceful, fibrous fracture of the composite in this invention. Low graphitized carbon fibers, such as commercially available PAN fibers, form strong interfaces with the black glass matrix and therefore produce low strength and brittle composites.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with graphite reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating could be done by dipping, spraying, brushing, or the like. In still another embodiment, the resin transfer technique can be employed in which the reinforcing fibers are placed in a mold and then the black glass precursor is added to fill the mold before curing to form a green molded product.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes. Alternatively, a continuous prepreg may be made by collimating hundreds of tows from different spools on a platform to form a resin-impregnated sheet after passing through a resin solution.

In a second method, a woven or pressed fabric of the reinforcing fibers is filled with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

A third method for fabricating the polymer composite is by resin transfer molding. In resin transfer molding a mold with the required shape is filled with the desired reinforcement material. The reinforcement could be a preform having a 3-dimensional weave of fibers, a lay-up of fabric plies, a non-woven mat of chopped staple or bundled tows, or assemblies of whiskers, and such others as are familiar to those skilled in the art. The filled mold is injected, preferably under vacuum, with the neat monomer solution with an appropriate amount of catalyst. The relative amounts of vinyl- and hydro-monomers will be adjusted to obtain the desired carbon level in the pyrolyzed matrix. The low viscosity (<50 centipoise) of the neat monomer solution is exceptionally well suited for resin impregnation of thick wall and complex shape components.

The filled mold is then heated to about 30° C.–150° C. for about ½–30 hours as required to cure the monomer solutions to a fully polymerized state. The specific cure cycle is tailored for the geometry and desired state of cure. For example, thicker wall sections require slower cures to prevent uneven curing and exothermic heat build-up. The cure cycle is tailored through control of the amount of catalyst added and the time-temperature cycle. External pressure may be used during the heating cycle as desired.

When the component is fully cured, it is removed from the mold. In this condition it is equivalent in state to the composite made by lamination and autoclaving of prepreg plies. Further processing consists of the equivalent pyrolysis and impregnation cycles to be described for the laminated components.

Solvents for the black glass precursor polymers include aliphatic and aromatic hydrocarbons, such as hexane, octane, toluene, benzene, and xylene, and ethers, such as tetrahydrofuran, ketones such as methyl ethyl ketone, and chlorocarbons such as carbon tetrachloride. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. Our resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. in an inert atmosphere (pyrolysis) converts the polymer into a black glass ceramic containing essentially only carbon, silicon, and oxygen. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70–80% of its theoretical density.

Conversion of the polymer to black glass takes place between 430° C. and 950° C. Three major pyrolysis steps were identified by thermogravimetric analysis at 430° C.–700° C., 680° C.–800° C. and 780° C.–950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density up to about 95% of the theoretical. The examples below illustrate the advantages obtained by using a highly graphitized carbon fiber and compare the performance with less highly graphitized carbon fibers.

EXAMPLE 1

Polymer Precursor Preparation

The cyclosiloxane having silicon-vinyl bond was poly-(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex in isooctane to give a 10 vol. percent solution of the cyclosiloxane monomers. The solution was heated to reflux conditions (about 100° C.) and refluxed for about 65 minutes. Then, the solution was chilled and concentrated in a vacuum distillation at 55° C. to a 33 wt. % concentration suitable for use in prepregging. The B-stage resin produced was poly(methyl methylenecyclosiloxane) (PMMCS).

EXAMPLE 2

Preparation of Test Specimens

The 33 wt. % poly(methyl methylenecyclosiloxane) (PMMCS) solution in isooctane was used for making a prepreg. Pitch-based graphite fiber E-130 (DuPont) was impregnated with the PMMCS resin by passing the filament through the resin solution. The coated fiber was wound on a rotating drum. The prepreg contained 31% by weight of PMMCS and 69% by weight fiber. The areal weight, which is defined as the weight of fiber per unit area in the prepreg, was 370 gm/m2.

3 in. by 4 in. (7.6 mm by 10.1 mm) plies were cut from the prepreg. Nine plies were laid-up unidirectionally to form a laminate. This [0]$_9$ laminate was consolidated using the following procedure:

1. heating to 65° C. at 3° C./min,
2. holding at 65° C. for ½ hour,
3. heating to 180° C. at 3° C./min,
4. holding at 180° C. for 30 min.
5. uncontrolled cooling to room temperature.

The consolidated green laminate was 0.095 in. (2.41 mm) thick and weighed 29.94 gms. The green laminate was then pyrolyzed in flowing nitrogen (flowrate=ca. 700 cubic cm per minute) to convert the PMMCS into black glass matrix composites using the following heating program:

1. heat to 550° C. at 60° C./hr
2. hold at 550° C. for 15 minutes,
3. heat to 850° C. at 100° C./hour
4. hold at 850° C. for 15 minutes,
5. uncontrolled cooling to room temperature.

The density of the as-pyrolyzed laminate was 1.31 gm/cc with a char yield of 94.8%. The laminate was then infiltrated with the neat monomer liquid (without solvent) in a 60/40 ratio ViSi/HSi having a 2 cp viscosity. After gelling the sol at 55° C. for 3–5 hours, the infiltrated laminate was then pyrolyzed using the same program as described above. A total of five impregnations were used to increase the density of the composite. The weight change resulting from these impregnations are given in the table below. BG(n) denotes composites after the nth impregnation and pyrolysis cycle.

TABLE A

| Step | Weight | % Wt. Change* |
|---|---|---|
| Green | 29.94 gm | — |
| BG(0) | 28.40 gm | −5.2% |
| BG(1) | 34.71 gm | +22.2% |
| BG(2) | 39.49 gm | +13.8% |

TABLE A-continued

| Step | Weight | % Wt. Change* |
|---|---|---|
| BG(3) | 41.35 gm | +4.7% |
| BG(4) | 42.58 gm | +3.0% |
| BG(5) | 43.32 gm | +1.7% |

*relative to previous step

The bulk density of the finished sample [i.e. BG(5)] was 1.99 gm/mL. The composition was 48 wt. % (44 vol %) E-130 graphite fiber and 52 wt. % (47 vol. %) black glass. The theoretical density was 2.19 gm/mL and thus 91% of the theoretical value.

EXAMPLE 3

Testing for Flexural Strength

The panel produced in Example 2 was cut into 4"×0.37"×0.095" test bars (101.6×9.4×2.41 mm).

3-point bend tests were performed on the graphite reinforced black glass bars prepared using an Instron tester. The span of the fixture was 3.5 inches (88.9 mm) giving a span-to-depth ratio of 37. Flexural strengths and strains at maximum stress for five samples are shown in the following table.

TABLE B

| Sample # | Width | Thickness | Bend Strength | Modulus | Strain |
|---|---|---|---|---|---|
| A | 0.375" | 0.070" | 70 Ksi | 29 Msi | 0.48% |
| B | 0.372" | 0.090" | 77 Ksi | 34 Ksi | 0.52% |
| C | 0.370" | 0.095" | 78 Ksi | 31 Msi | 0.46% |
| D | 0.372" | 0.096" | 76 Ksi | 27 Msi | 0.58% |
| E | 0.373" | 0.091" | 68 Ksi | 32 Msi | 0.45% |
| Ave. | | | 74 Ksi | 31 Msi | 0.50% |

Fibrous fracture was observed for all samples. For comparison, similar black glass composites prepared with PAN-derived graphite fibers (T-650/35 from Amoco) had bend strengths of 21 Ksi, densities of 1.93 g/mL, strain at maximum stress of 0.2%, and exhibit brittle fracture. The T-650/35 fiber has 94% carbon and its electrical resistivity is $1.49 \times 10^{-3}$ ohm-cm. This contrasts with E-130 fiber which is 99+% carbon and has an electrical resistivity of about $0.22 \times 10^{-3}$ ohm-cm. This example demonstrates the importance of using graphite fibers having a high degree of graphitization.

EXAMPLE 4

Effect of Heat Treatment

Composites made according to Example 2 were heated in air at varying temperatures and times. The heated test bars were then bend tested at room temperature as in Example 3. The results are given in the following table.

TABLE C

| Heat Treatment | Weight Loss | 3-pt. Bend Strength | Modulus | Strain at Max. Stress | Fracture Mode |
|---|---|---|---|---|---|
| E-130/BG as-prepared | — | 74 ± 4 Ksi | 31 Msi | 0.50% | Fibrous |
| 400 C./ | Nil | 60 ± 11 Ksi | 16 Msi | 0.65% | Fibrous |

TABLE C-continued

| Heat Treatment | Weight Loss | 3-pt. Bend Strength | Modulus | Strain at Max. Stress | Fracture Mode |
|---|---|---|---|---|---|
| 16 Hr/ Air 500 C./ 16 hr/ Air | −2.6 wt. % | 56 ± 4 Ksi | 15 Ksi | 0.45% | Fibrous |
| 600 C./ 19 hr/ Air | −9.1 wt. % | 16 Ksi | 4 Msi | 1.8% | Fibrous |

It will be seen that essentially no weight loss was found after an extended period at 400° C. in air and the performance in the bend test was substantially the same. Higher temperatures produced increasing weight loss and reduced strength, but the mode of failure remained fibrous. Since black glass is known to have resistance to oxidation to much higher temperatures, say to 1400° C., the weight loss is attributed to oxidation of the graphite fibers, which would have reduced transfer of the load to the fiber.

EXAMPLE 5

Six plies of a prepreg made as in Example 2, but using E-35 (DuPont) pitch-based graphite fiber. This graphite has a modulus of 35 Msi and a density of 1.95 gm/mL compared to a modulus of 130 Msi and a density of 2.2 g/mL for the E-130 fiber used in Example 2. The prepreg contained in 30.6 wt. % black glass resin. Six plies of the prepreg were vacuum compacted and hot pressed at 180° C. to form a green laminate as in Example 2 and then pyrolyzed and diversified as described previously for the E-130 fiber composite. The process is summarized in the following table (compare with Table A).

TABLE D

| Step | Weight | % Wt. Change |
|---|---|---|
| Green | 23.54 gm | — |
| BG(0) | 22.31 gm | −5.2% |
| BG(1) | 26.11 gm | +17.0% |
| BG(2) | 27.96 gm | +7.1% |
| BG(3) | 29.21 gm | +4.5% |
| BG(4) | 29.78 gm | +1.9% |
| BG(5) | 29.95 gm | +0.6% |

The finished composite [E-35/BG(5)] was 1.95 g/mL or 95% theoretical density. The composite was 54.6 wt. % (55 vol. %) E-35 fiber and 45.5 wt. % (40 vol. %) black glass.

Four 5"×0.255"×0.06" (127×6.48×1.52 mm) test bars were cut from the fully impregnated laminate panel. When tested in the 3-point bend test of Example 3, a bend strength of 42 Ksi with 0.3% strain at maximum stress was measured. The fracture mode was less brittle than the PAN-derived composite, but less fibrous than the E-130-derived composite.

As in Example 4, the E-35/black glass composites were heat treated to determine the thermal stability and effect of oxidation. The results are shown in the following table.

TABLE E

| Heat Treatment | Weight Loss | 3-pt. Bend Strength | Modulus | Strain at Max. Stress | Fracture Mode |
|---|---|---|---|---|---|
| E-35/BG as-prepared | — | 42 ± 7 Ksi | 15 Msi | 0.3% | Brittle but fibrous |
| 400 C./ 10 hr/ Air | Nil | 48 ± 2 Ksi | 14 Msi | 0.4% | Fibrous |
| 488 C./ 6 Hr/ Air | −0.62 wt. % | 101 ± Ksi | 14 Msi | 0.9% | Fibrous |
| 500 C./ 12 hr Air | N/A | 79 ± 2 Ksi | 12 Msi | 0.8% | Fibrous |

The results of heat treatment at 400° C. were similar to those of Example 4, but the mode of failure became fibrous. Further heating at higher temperature produced a dramatic increase in bend strength, becoming even greater than that found with the E-130 fiber. It is believed that oxidation reduced the bonding of the fibers to the matrix, resulting in the improved results. Consequently, in some instances, it may be desirable to heat a composite in air at a temperature up to about 350° C. for sufficient time to oxidize the surface of the carbon fibers and improve the strength of the composite.

EXAMPLE 6

Another pitch-based carbon fiber, P-55 produced by Amoco having a modulus of 75 Msi, a tensile strength of 300 Ksi and a density of 2.0 gm/mL was used to prepare black glass reinforced composites as previously described. The bulk density of the composite was 1.96 gm/mL or 94% of theoretical. Black glass was 43 wt. % (39 vol. %) and P-55 fiber was 57 wt. % (55 vol. %). P-55 fiber has 99+% carbon and an electrical resistivity of $0.7 \times 10^{-3}$ ohm-cm.

Test bars of 3.1"×0.25"×0.08" (78.7×6.35×2 mm) were cut from the laminate panel and given a 3-point bend test using a 2.8" (71.1 mm) span (span/depth 35/1). The results are given in the following table.

TABLE F

| Sample # | Bend Strength | Modulus | Strain at Max. Stress | Fracture Mode |
|---|---|---|---|---|
| A | 64 Ksi | 18 Msi | 0.45% | Fibrous |
| B | 59 Ksi | 16 Msi | 0.45% | Fibrous |
| C | 61 Ksi | 15 Msi | 0.45% | Fibrous |
| Average | 61 Ksi | 16 Msi | 0.45% | |

P-55 composites were heated to 400° C. in stagnant air for 66 hours. The weight loss was 0.9%. Room temperature bend strength of the heat-treated sample was 48 Ksi with a modulus of 16 Msi. The composite failed in fibrous fracture.

EXAMPLE 7

A low cost P-55 pitch-based fiber from Amoco was used to prepare black glass composite. The P-55 fiber is 99+% carbon with an electrical resistivity of $0.85 \times 10^{-3}$ ohm-cm. The composite was made through five impregnation/pyrolysis cycles, yielding the final density of 1.88 gm/mL. The volume ratio between fiber, matrix, and void in the composite was 56:40:4. The properties of the as-prepared and heat-treated samples were listed as follows:

TABLE G

| Heat Treatment | Bend Strength | Modulus | Strain at Max. Stress | Weight Change |
|---|---|---|---|---|
| As-prepared | 42 Ksi | 9.9 Msi | 0.46% | 0.0% |
| 400 C./27 hr/Air | 46 Ksi | 13.0 Msi | 0.40% | +2.0% |
| 400 C./93 hr/Air | 43 Ksi | 11.8 Msi | 0.42% | −0.5% |
| 500 C./12 hr/Air | 43 Ksi | 12.1 Msi | 0.39% | −1.8% |
| 500 C./16 hr/Air | 44 Ksi | 10.3 Msi | 0.49% | +2.0% |

All samples exhibited fibrous fracture with strain at maximum stress of about 0.4–0.5%. The composites retained their strength properties even after prolonged exposure in air at 400°–500° C. This example demonstrates that graphite fiber reinforced black glass has thermal stability up to at least 500° C. in oxidizing atmosphere.

I claim:

1. A carbon fiber-black glass composite consisting essentially of
    (a) carbon reinforcing fibers having a high degree of graphitization resulting from treatment in an inert atmosphere above 1700° C.; and
    (b) a black glass matrix having the empirical formula SiCxOy where x ranges from about 0.5 to about 2.0 and y ranges from about 0.5 to about 3.0.

2. The composite of claim 1 wherein x ranges from about 0.9 to about 1.6 and y ranges from about 0.7 to about 1.8.

3. The composite of claim 1 wherein the black glass matrix of (b) is a pyrolyzed reaction product of a polymer prepared from (1) a cyclosiloxane monomer having the formula

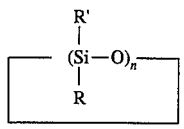

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, said polymer being prepared by reaction of said monomers in the presence of an effective amount of hydrolsilylation catalyst.

4. The composite of claim 1 wherein the carbon fiber of (a) is a pitch-based fiber.

5. The composite of claim 1 wherein the carbon fiber of (b) has been graphitized by heating to a temperature above 1700° C.

6. The composite of claim 5 wherein the carbon fiber is a surface-graphitized polyacrylonitrile-based carbon fiber.

7. The composite of claim 5 wherein the carbon fiber is a surface-graphitized rayon-based carbon fiber.

8. The composite of claim 1 wherein the carbon fiber is coated with a carbon layer having a high degree of graphitization resulting from heat treatment in an inert atmosphere above 1700° C.

9. The composite of claim 8 wherein said carbon fiber is deposited by chemical vapor deposition.

10. The composite of claim 1 wherein said carbon fiber of (b) is at least 97% carbon and has an electrical resistance of less than about $1.2 \times 10^{-3}$ ohms-cm.

* * * * *

UNITED STATES PATENT AND TRADEMARK OFFICE
CERTIFICATE OF CORRECTION

PATENT NO. : 5,587,345

DATED : December 24, 1996

INVENTOR(S) : Roger Y. Leung

It is certified that error appears in the above-identified patent and that said Letters Patent is hereby corrected as shown below:

Col. 14, line 32, "carbon fiber" should read --carbon layer--

Signed and Sealed this

Twenty-second Day of April, 1997

Attest:

BRUCE LEHMAN

*Commissioner of Patents and Trademarks*

*Attesting Officer*